United States Patent
Van Der El

(10) Patent No.: US 11,684,022 B2
(45) Date of Patent: Jun. 27, 2023

(54) APPARATUS AND METHOD FOR PLANTING PLANT CUTTINGS

(71) Applicant: IG Specials B.V., Gameren (NL)

(72) Inventor: Wim Van Der El, Ameide (NL)

(73) Assignee: IG Specials B.V., Gameren (NL)

( * ) Notice: Subject to any disclaimer, the term of this patent is extended or adjusted under 35 U.S.C. 154(b) by 0 days.

(21) Appl. No.: 15/544,264

(22) PCT Filed: Jan. 18, 2016

(86) PCT No.: PCT/EP2016/050897
§ 371 (c)(1),
(2) Date: Jul. 18, 2017

(87) PCT Pub. No.: WO2016/116402
PCT Pub. Date: Jul. 28, 2016

(65) Prior Publication Data
US 2018/0007842 A1    Jan. 11, 2018

(30) Foreign Application Priority Data
Jan. 19, 2015 (NL) ...................................... 2014155

(51) Int. Cl.
*A01G 9/08*    (2006.01)

(52) U.S. Cl.
CPC .............. *A01G 9/083* (2013.01); *A01G 9/086* (2013.01)

(58) Field of Classification Search
CPC ...... B25J 9/0015; B25J 9/0093; B25J 9/0096; B25J 9/1679; B25J 9/1697; A01G 2/10; A01G 2003/023; A01G 9/0299; A01G 9/083; A01G 9/08; A01G 9/086; A01G 9/143

USPC ......................................... 47/1.01 P, 58.1 CF
See application file for complete search history.

(56) References Cited

U.S. PATENT DOCUMENTS

| | | | | |
|---|---|---|---|---|
| 4,106,414 A | * | 8/1978 | Vastag .................... | A01C 7/042 53/247 |
| 4,843,982 A | * | 7/1989 | Nagy-Szakaly ......... | A01C 7/02 111/96 |
| 4,947,582 A | * | 8/1990 | Visser ................... | A01C 11/025 111/104 |

(Continued)

FOREIGN PATENT DOCUMENTS

| | | | | |
|---|---|---|---|---|
| EP | 1829446 A2 | 9/2007 | | |
| EP | 2055181 A1 | * 5/2009 | ............. | A01G 9/083 |

(Continued)

OTHER PUBLICATIONS

International Search Report PCT/EP2016/050897 dated Mar. 31, 2016.

*Primary Examiner* — Joshua J Michener
*Assistant Examiner* — Morgan T Jordan
(74) *Attorney, Agent, or Firm* — David P. Owen; Hoyng Rokh Monegier B.V.

(57) ABSTRACT

A pick-and-plant head for planting plant cuttings in a cultivation medium. The pick-and-plant head is provided with a grasper including opposed grasping surfaces for grasping a portion of a cutting between them and with an abutment that abuts a cutting. The grasper and abutment are moveable relative to one another and are arranged so that during release of a cutting from the grasper the abutment passes between the opposed grasping surfaces and the cutting is abutted by the abutment.

18 Claims, 17 Drawing Sheets

(56) References Cited

U.S. PATENT DOCUMENTS

| | | | | |
|---|---|---|---|---|
| 5,068,999 A | * | 12/1991 | Visser | A01C 11/025 47/1.7 |
| 5,215,550 A | * | 6/1993 | Tesch, Jr. | A01C 11/025 111/101 |
| 5,431,116 A | * | 7/1995 | Gao | A01C 11/025 111/105 |
| 5,557,881 A | * | 9/1996 | Bouldin | A01G 9/086 47/1.01 R |
| 5,860,372 A | * | 1/1999 | Bouldin | A01G 9/086 111/104 |
| 5,911,631 A | | 6/1999 | Bouldin et al. | |
| 6,212,821 B1 | * | 4/2001 | Adam | A01C 11/02 47/1.01 R |
| 7,984,583 B2 | * | 7/2011 | Tagawa | A01G 9/086 47/1.01 P |
| 8,504,204 B2 | * | 8/2013 | Owens, Jr. | B25J 9/1687 700/259 |
| 8,683,739 B2 | * | 4/2014 | Bijl | A01G 9/0299 47/1.7 |
| 2006/0260522 A1 | * | 11/2006 | Fountain | A01C 11/025 111/105 |
| 2010/0180500 A1 | * | 7/2010 | Visser | A01G 9/086 47/86 |
| 2012/0005955 A1 | * | 1/2012 | Visser | A01G 9/0299 47/66.7 |
| 2012/0017507 A1 | * | 1/2012 | Owens, Jr. | A01G 9/143 901/30 |

FOREIGN PATENT DOCUMENTS

| | | | | |
|---|---|---|---|---|
| FR | 2635637 A1 | * | 8/1989 | |
| FR | 2685852 A1 | * | 7/1993 | A01C 11/025 |
| FR | 2738988 A1 | * | 3/1997 | A01G 9/086 |
| GB | 1326464 A | * | 7/1971 | B25J 15/026 |
| NL | 1012417 C | | 3/2001 | |
| WO | WO-9702397 A1 | * | 1/1997 | B25J 15/026 |
| WO | 03022034 A1 | | 3/2003 | |
| WO | 2012101132 A1 | | 8/2012 | |
| WO | 2013174893 A1 | | 11/2013 | |

* cited by examiner

APPARATUS AND METHOD FOR PLANTING PLANT CUTTINGS

FIELD OF THE INVENTION

The invention relates to an apparatus for picking and planting cuttings of plants in a cultivation medium. The invention further relates to a method of picking and planting cuttings of plants in a cultivation medium as well as to a computer readable medium having computer readable instructions stored thereon for performing, when executed by a processor, such a method. The invention also relates to a pick-and-plant head for picking and planting cuttings in a cultivation medium. Furthermore, the invention relates to an apparatus for picking and planting cuttings of plants in a cultivation medium comprising such pick-and-plant head.

BACKGROUND OF THE INVENTION

Nowadays, placing plant cuttings in a cultivation medium is often still done manually. Besides being time consuming, each individual person plants the cuttings in a slightly different way. Furthermore, the position and orientation of the placed cuttings may vary widely as well. As a result, besides being expensive, the propagation success rate of the cuttings can be unreliable.

Dutch patent publication NL 1012417 describes a method and apparatus for planting cuttings into trays. Cuttings are transported upon a number of conveyor belts. In an example discussed therein, cuttings are angularly oriented in the horizontal plane upon a rotatable disc within an conveyor belt. The oriented cuttings are conveyed to a grab-arm located at the end of the conveyor. The grab-arm in its entirety rotates, and a grab-tip rotates in the opposite direction, whereby the cutting is eventually vertically oriented for placement in a tray.

Such a device is complex, requiring a plurality of conveyor belts with turntables to orient and gather cuttings for placement. The required positioning of the various components requires a large volume of factory space, both horizontally and vertically. The latter in particular can make operator access difficult. In addition, the coordinated timing of the large number of supply conveyor belts, the rotating grab-arm, and the final product conveyor, is highly sensitive and logistically fragile.

International publication WO03/022034 describes a method and apparatus for collecting cuttings from a conveyor belt and placing these cuttings in pots. The apparatus includes a pick and place tool on a robot arm, for picking cuttings from the conveyor belt and placing them into pots. The pick and place tool includes a number of vacuum/suction-cup pick-up means, each for picking up and retaining a cutting from the conveyor belt. The cuttings are initially picked in a horizontal orientation, and after a number of intermediate steps are translated into a vertical orientation with the cut surface downward for planting into a pot.

The tool furthermore comprises an array of elongate fingers opposing and aligned with the suction cups. These are utilized to create indentations in the cultivation medium of the pots prior to the cuttings being brought into their final orientation and planted.

The method and apparatus described in WO03/022034 have several disadvantages. For example, the apparatus and method can lead to cutting placement having insufficient uniformity. Although the cuttings are said to be picked up with a predetermined orientation relative to the tool, the sequential picking of adjacent cuttings may cause the orientation of the picked cuttings with respect to the tool to change due to interaction with each other, in particular during the picking process. As a result, some cuttings are placed into the pots with an orientation different from the predetermined orientation, which results in a poorly placed cutting. Furthermore, the pick and place tool may suffer reduced accuracy, a need for greater control, motion and rotation steps, in order to use the indentation fingers.

European patent publication EP1829446 describes an assembly for placing cuttings in plant plugs in which individual cuttings are gripped by one of the arms of a rotating device by means of low-pressure. The cuttings are then transferred to a belt provided with grippers. This transfer movement takes place continually and in a rotating manner.

However, the assembly described in EP1829446 has several disadvantages. First, the use of a rotating device for picking individual cuttings occupies a lot of space. Furthermore, the throughput of the assembly is sensitive to logistics failure. The cuttings need to be supplied individually with a spacing between subsequent cuttings, with very narrow tolerances. For example, if the subsequent cuttings are supplied too close together, either one of the cuttings is not processed, or the rotating speed of the rotating device should be adapted, i.e. increased, to allow pick up of both cuttings. The first option would decrease the throughput, whereas the second option complicates control of the rotating device.

International publication WO2012/101132 describes a method and apparatus for gathering and placing cuttings of plants in a cultivation medium to achieve a predetermined planting pattern. In a method described therein, a number of cuttings are haphazardly distributed upon a generally horizontal conveyer, after which a pattern recognition camera system is used to identify a plurality of individual cuttings from the group, which are suitable to be gathered. A pick up tool is directed to pick up the identified cuttings, its angular orientation in the horizontal place at each pick up being controlled such that the gathered cuttings are horizontally aligned with their cut stems in a single direction. The gathered cuttings are transferred from the pick up tool into a horizontal cutting holding unit. The cutting holding unit rotates to a vertical orientation with the stems downward and descends to place the cuttings within a cultivation medium. The planting system and the pick-up tool are separate entities.

Such a method and apparatus offers effective and efficient planting of cuttings, particularly at high capacity throughputs. However, in some circumstances, and for some plant cutting types, such a device may not be optimal.

The present invention is concerned with addressing one or more the above concerns, and with providing further useful devices and methods for planting cuttings, while at the same time maintaining high levels of effectiveness and efficiency.

SUMMARY OF THE INVENTION

It is an object of the invention to provide an apparatus and method for placing plant cuttings in a cultivation medium with excellent performance, in particular with respect to throughput, precision and reliability.

For this purpose, an aspect of the invention provides a pick-and-plant head for planting plant cuttings in a cultivation medium comprising: a grasper comprising opposed grasping surfaces for grasping a portion of a cutting between them; and an abutment comprising an abutment surface for abutting a cutting, wherein the grasper and abutment are moveable relative to one another and are arranged so that during release of a cutting from the grasper, the abutment passes between the opposed grasping surfaces, and the cutting is abutted by the abutment.

A pick-and-plant head is a tool-head that carries out both picking and planting of a cutting. Use of a pick-and-plant head is advantageous because during the planting process a cutting is subjected only once to a grasping and release action by the planting apparatus. This limits the number of handlings a cutting undergoes. This can be advantageous in avoiding damage to cuttings (especially for relatively soft plant material) and in avoiding excessive machine complexity required to maintain correct planting orientation of the cuttings when planting.

A grasper offers excellent orientation control of a cutting, both during pick up, as well as during planting.

The abutment of the pick-and-plant head preferably comprises a ram having a distal end, wherein a distal end-face of the ram is the abutment surface for the cutting. Such a ram can be of various shapes, but is preferably a wedge or a rod. The distal cutting abutment surface, or the end face, can have any form suitable for abutting a cutting's body or stem. For example, it may be planar or it may be concave, ribbed, or contoured to generally match an abutted surface of a cutting.

In some embodiments a distal end of the ram has a wedge-shape. This advantageously forms a wedge surface for insertion between the opposed grasping surfaces to force these apart for simple release of a grasped cutting from therebetween.

Preferably the wedge-shaped ram has a truncated, or angled distal end-face. The distal end face is preferably substantially horizontal when the pick-and-plant head is in a horizontal pick-up orientation. A horizontal pick-up orientation is that orientation of the pick-and-plant head when it is arranged or positioned to pick or grasp a cutting from a substantially horizontal pick-up surface. The end face of the truncated ram is preferably substantially parallel with the planar pick-up surface in the pick-up orientation.

The grasper of the pick-and-plant head is preferably provided with at least one elongate member, and one of the two opposed grasping surfaces is formed by an inner surface of the elongate member. Preferably the grasper comprises two opposed, elongate members, the two opposed grasping surfaces being provided on the opposed elongate members.

The grasping surfaces may be inner surfaces of each of the distal ends of the elongate opposed members. Such a configuration may resemble pincers, tongs, tweezers or forceps. Thus the grasper may preferably comprise opposed fingers with substantially flat, distal gripping surfaces. The opposed fingers may be pivoted at a proximal end, or may be held movably in relation to one another for effecting gripping and releasing motions in another manner, such as by movement laterally toward and away from one another.

Such a grasper offers excellent orientation control of a cutting, both during pick up, as well as during planting. The form of the grasper with elongate members offers the particular advantage that a relatively large portion of the cutting stem can be grasped along at least a part of the elongate member. This provides for an additionally secure grip on the cutting, aiding in accurate orientation for pick-up and planting. This is particularly the case in which the grasper has the form of tongs, forceps, pincers or tweezers Each elongate member is preferably a strip, is preferably resiliently flexible, and is preferably formed of plastics or metal, most preferably spring steel, stainless steel or aluminium. A degree of resilient flex within the elongate strip allows for a firm grip upon the cutting without application of excessive force that might damage the stem. The force applied by the grasper upon a cutting can be controlled by pneumatics.

In a preferred embodiment, the ram is positioned between the elongate members, and the ram and members are moveable relative to one another for axial reciprocation of the ram between the opposed gripping surfaces. As the ram advances, or is inserted between the opposed elongate members, it forces them apart, releasing a cutting held therebetween.

The pick-and-plant head is further preferably provided with a grasper that is pivotable in a vertical plane. This is such that the head can collect a cutting in a horizontal orientation and rotate it into a substantially vertical orientation ready for planting. Vertical rotations of about 90° are most preferred, but other rotations are possible, for example, from 80° to 100°, depending upon circumstances and cutting type. In an alternative aspect of the invention there is provided a pick-and-plant head for planting plant cuttings in a cultivation medium comprising: a grasper comprising opposed elongate members with grasping surfaces for grasping a portion of a cutting between them; wherein the grasper is angled from horizontal by from 10° to 80°, preferably from 20° to 70°, and most preferably from 30° to 60°, when the pick-and-plant head is in a pick-up orientation. The elongate members are preferably straight, doglegged or L-shaped In a further alternative aspect of the invention, there is provided a pick-and-plant head for planting plant cuttings in a cultivation medium comprising: a grasper comprising opposed grasping surfaces for grasping a portion of a cutting between them; and a spacer arranged to space the grasper from a horizontal cuttings supply surface during a pick up operation.

The spacer may be positioned adjacent the opposed grasping surfaces. It may also be arranged to space the grasper about 0.1 mm or more above the supply surface during a pick-up operation, preferably about 0.15 mm or more, and more preferably about 0.2 mm or more.

The spacer is preferably oriented adjacent distal ends of elongate grasping members. Most preferably the spacer has the form of an inverse U and the distal ends of the elongate members are positioned therein when in the pick-up position.

In a further aspect of the invention there is provided a robotic arm provided with any of the pick-and-plant heads as substantially described herein.

In a further aspect of the invention, there is provided an apparatus for planting cuttings of plants in a cultivation medium comprising:

a cuttings supply system for supplying a plurality of cuttings;

a camera system for identifying cuttings among the plurality of cuttings provided by the supply system that are suitable for individual pick up by using pattern recognition;

and a robotic arm provided with one or more pick-and-plant heads, wherein said one or more pick-and-plant heads are any of the pick-and-plant heads as described herein.

In a further alternative aspect of the invention there is provided, an apparatus for planting cuttings comprising:

a cuttings supply system for supplying a plurality of cuttings, comprising a supply surface upon which a plurality of cuttings can be scattered;

a camera system configured to identify by pattern recognition at least one cutting amongst the plurality of cuttings, as suitable for individual pick up;

a robotic arm provided with a pick-and-plant head for picking said one or more identified cuttings from the supply surface and for planting the picked one or more cuttings in a plant cultivation medium;

wherein the pick-and-plant head comprises a grasper comprising two opposed grasping surfaces for grasping a portion of an identified cutting; and wherein the pick-and-plant head is pivotable in a vertical plane.

The supply surface is preferably substantially horizontal. This aids in a stable dispersion of the cuttings over the supply surface because the cuttings remain stably immobile unless purposefully agitated for dispersion.

The apparatus may be configured such that the pick-up tool picks up identified cuttings at a predetermined distance from a cutting end to be planted in the cultivation medium depending upon data from one or more images obtained with the camera system.

Preferably, the apparatus is provided with any of the pick-and-plant heads as described above.

In general application to the various aspects of the invention, the cuttings supply system comprises a moveable surface for supporting the supplied cuttings. The moveable surface preferably comprises the substantially horizontal supply surface. Use of a moveable surface may aid in spreading the cuttings, and so aid in identification and pick-up of individual cuttings among the plurality of cuttings.

The moveable surface may be moveable in dependence on one or more images obtained via the camera system. On the basis of the actual placement and orientation of cuttings in the supply system a movement program may be executed for controlling movement of the moveable surface.

Movement of the surface may be used to haphazardly distribute or disperse the cuttings over the horizontal supply surface. Vibrating, shaking, pulsating, jabbing, wave imparting, and irregular motions may be used to disperse the cuttings. A discussion of various movements and suitable systems are found in international patent publication WO2013/174893, the contents of which is herein incorporated in its entirety by reference.

In a still further aspect of the invention there is provided a method of planting plant cuttings in a cultivation medium comprising:

providing a scattered plurality of cuttings upon a substantially horizontal supply surface of a cuttings supply system; identifying by way of pattern recognition, at least one cutting amongst the plurality of cuttings as suitable for individual pick up; picking said identified cutting from the supply surface in a substantially horizontal orientation, with a pick-and-plant head on a robotic arm; rotating the picked cutting into a substantially vertical orientation with a plantable end of the cutting facing downward, with the pick-and-plant head; and planting the substantially vertical cutting into a cultivation medium, with the pick-and-plant head; wherein the pick-and-plant head comprises a grasper comprising two opposed grasping surfaces for grasping a portion of an identified cutting.

A further embodiment of the method includes the step of agitating the horizontal supply surface to disperse or re-disperse cuttings thereon.

In a further embodiment of the method the cuttings supply system comprises a conveyor belt, and the conveyor belt comprises the substantially horizontal supply surface.

In a further embodiment identified cuttings are grasped at a predetermined distance from a plantable end of the cutting, in dependence on one or more images obtained with the camera system.

In a still further method the cuttings supply system includes an irregularly moveable surface comprising the supply surface, and wherein providing cuttings includes controlling the irregularly moveable surface to disperse or re-disperse cuttings upon the supply surface.

The apparatus for placing cuttings of plants in a cultivation medium may comprise a computer system comprising a processor with peripherals to enable operation of a method of planting cuttings as described above. The processor may be connected with one or more memory units which are arranged for storing instructions and data, one or more reading units, one or more input devices, such as a keyboard, touch screen, or mouse, and one or more output devices, for example a monitor. Further, a network Input/Output (I/O) device may be provided for a connection to the networks.

The processor may comprise several processing units functioning in parallel or controlled by one main processor, that may be located remotely from one another, possibly distributed over the local area network, as is known to persons skilled in the art. The functionality of the present invention may be accomplished by a combination of hardware and software components. Hardware components, either analogue or digital, may be present within the processor or may be present as separate circuits which are interfaced with the processor. Further it will be appreciated by persons skilled in the art that software components that are executable by the processor may be present in a memory region of the processor.

Embodiments of the method may be stored on a computer readable medium, for example a DVD or USB-stick, for performing, when executed by the processor within the cutting placement apparatus, embodiments of a method placing cuttings of plants in a cultivation medium. The stored data may take the form of a computer program, which computer program is programmed to implement an embodiment of the method when executed by the computer system after loading the computer program from the computer readable medium into the computer system.

BRIEF DESCRIPTION OF THE DRAWINGS

Various aspects of the invention will be further explained with reference to embodiments shown in the drawings wherein.

DESCRIPTION OF ILLUSTRATIVE EMBODIMENTS

The following is a description of various embodiments of the invention, given by way of example only and with reference to the drawings.

Figure 1:
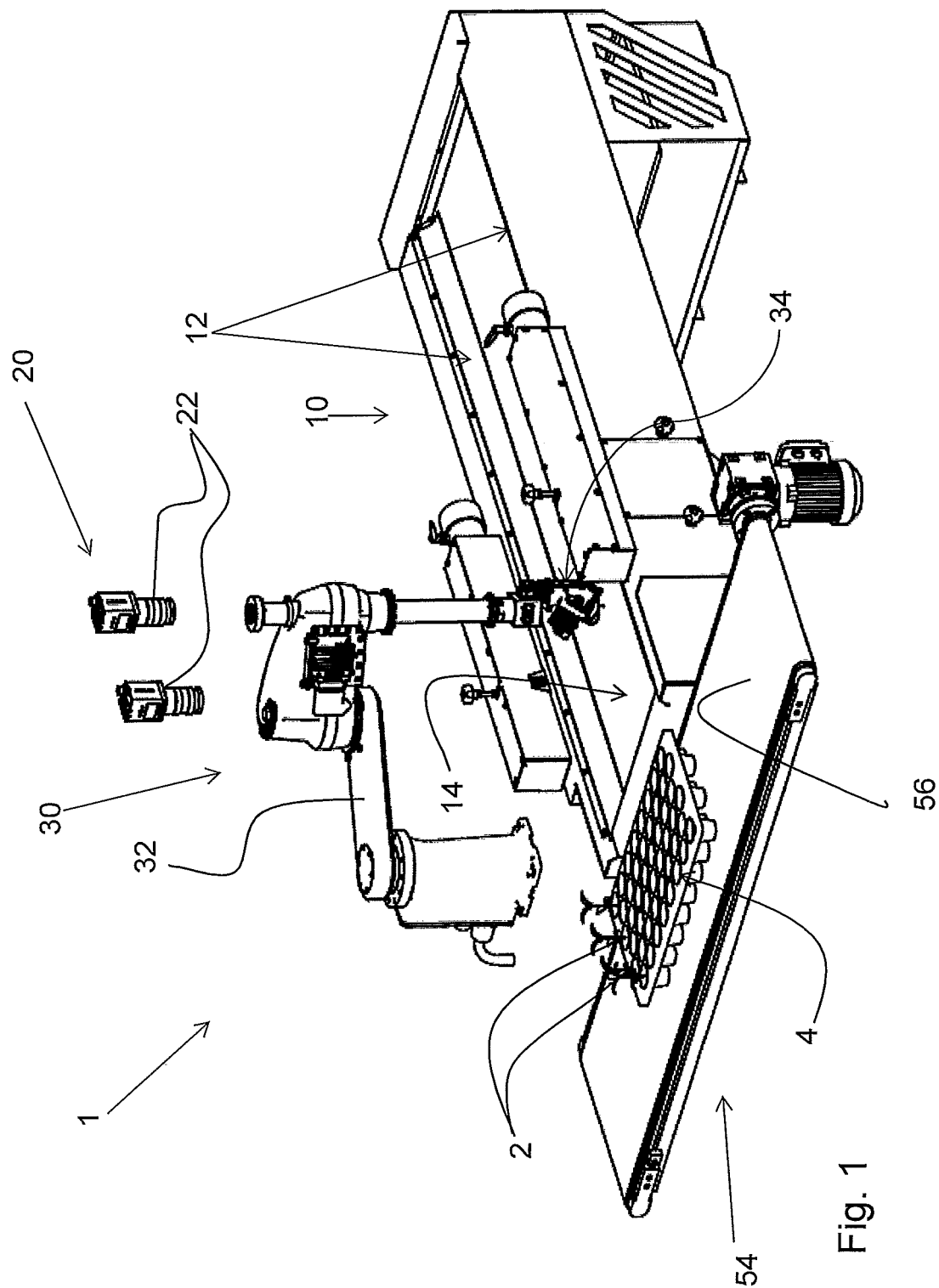
FIG. 1 shows an elevated view of an apparatus for placing plant cuttings in a cultivation unit according to an embodiment of the invention.

FIG. 1 shows an apparatus 1 for planing cuttings of plants in a cultivation medium.

The plant cuttings may be cuttings of any sort, and may include cuttings having a stem and one or more leaves, further referred to as stem cuttings, cuttings predominantly consisting of leaves, further referred to as leaf cuttings, as well as cuttings having a tuber or root, further referred to as tuber or root cuttings. Examples of stem cuttings include, but are not limited to, cuttings of chrysanthemum, Christmas star, boxwood, flamingo flower ('anthurium'), and panda plant ('kalanchoe'). Examples of leaf cuttings include, but are not limited to, cuttings of crab cactuses, and conifer. Examples of tuber or root cuttings include, but are not limited to cuttings of cranesbill ('geranium').

The apparatus 1 comprises a cuttings supply system 10 for supplying a plurality of cuttings 2. The cuttings supply system 10 may comprise a cuttings inlet for supply of cuttings 2 to the cuttings supply system 10.

In the shown embodiment, the cuttings 2 may be placed onto the cuttings supply system 10 via an opening, either manually by a human operator or automatically, for example via a conveyor belt.

Preferably, the cuttings supply system 10 takes the form of a container having side walls 12 and a cuttings supply surface 14. The cuttings supply surface 14 supports the cuttings. The shown cuttings supply surface 14 is horizontal, and this provides for a stable distribution of the cuttings over the surface. Supply surfaces angled slightly from horizontal are possible and may still provide a stable distribution, but are not preferred. The side walls 12 ensure that the cuttings are kept within the container. A container occupies little space, which makes the apparatus 1 compact. Additionally, movement and/or instalment of the apparatus 1 may be easy as well.

The cuttings supply surface 14 may be, at least partially, moveable. For example, the cuttings supply surface 14 may be mechanically agitated or excited to haphazardly distribute or disperse the cuttings over the horizontal supply surface. Such movements may include vibrating, shaking, pulsating, jabbing, wave impartation, and irregular motions. In a typical scenario, cuttings 2 are provided to the cuttings supply surface 14 in a bulk or mass by a human operator or by a conveyor belt. The cuttings supply surface 14 is then agitated or excited as discussed above so that the individual cuttings 2 are disentangled from the delivered bulk or mass of cuttings 2 and are spread out over the cuttings supply surface 14.

Disentanglement and disbursement of the cuttings 2 is advantageous in aiding pick-up of individual cuttings 2 from the cuttings supply surface 14 as discussed in further detail below.

The cuttings supply surface 14 preferably comprises a flexible, sheet of material held under tension. Examples of such materials are found in conveyor belt systems for transporting cuttings. A flexible sheet of material is susceptible to prodding and shaking to give the discussed distribution movements.

The cuttings supply surface 14 may be implemented as a conveyor belt upon which cuttings are conveyed toward a pick-up zone, within which a pick-and-plant tool 30 can pick.

The apparatus further comprises a camera system 20 for identifying individual cuttings 2 among the plurality of cuttings provided by the supply system 10 that are suitable for individual pick up. The camera system 20 comprises one or more cameras 22. Based on images obtained with the one or more cameras 22, cuttings that are suitable for individual pick up are identified using pattern recognition techniques. For example, in the case of stem cuttings, the camera system 20 may be arranged to identify individual stems based on the recognition of a pattern corresponding to an individual stem of a stem cutting lying on the cuttings supply surface 14. The images provided by the camera system 20 may be any type of suitable image including 2-dimensional images and 3-dimensional images. In the case of 3-dimensional imaging, the camera system 20 generally includes more than one camera 22.

The apparatus further comprises a pick-and-plant tool 30. The pick-and-plant tool 30 is communicatively coupled to the camera system 20. The pick-and-plant tool 30 is arranged for picking up cuttings 2 identified by the camera system 20 from among the plurality of cuttings 2, and planting the picked cuttings 2 directly into a plant cultivation medium 4.

The shown pick-and-plant tool 30 is provided with a robot arm 32 and a pick-and-plant head 34.

The pick-and-plant head is discussed in more detail in relation to FIGS. 2 to 7.

The robot arm 32 is preferably provided with a number of degrees of freedom to position and orient the pick-and-plant head for pick up, transport, and planting of picked-up cuttings into the cultivation medium 4.

In some applications a robot arm 32 having 4 degrees of freedom is provided, i.e. 3 rotation axes, where one axis is arranged to allow transfer along the axis (preferably in a direction substantially perpendicular to the bottom surface of the cuttings supply system) is sufficient. In alternative applications a more sophisticated robot arm 32 is provided, for example a robot arm 32 capable of picking up cuttings in a variety of three-dimensional (3D) orientations using 3D-images. These more sophisticated robot aims 32 may be arranged to operate with 6 degrees of freedom.

The robot arm 32 is programmed to move the pick-and-plant head 34 to a selected cutting 2 on the cuttings supply surface 14 of the cuttings supply system 10, and to position the pick-and-plant head 34 into a suitable orientation to grasp, i.e. pick, a cutting 2. For this purpose, the cutting position (for example using Cartesian-coordinates, as will be understood by a person skilled in the art) and the orientation of the cutting are obtained using images from the camera system 20 in combination with pattern recognition.

Once the pick-and-plant head 10 has grasped the desired cutting 2, the robot arm 32 is programmed to move the pick-and-plant head 34 along with the grasped cutting 2 to planting coordinates within a plant cultivation medium 4, where the cutting is then planted into the medium. The specific details of the action of the pick-and-plant head 34 is discussed in greater detail in relation to FIGS. 2 to 8*j*.

The apparatus 1 may further comprise a cultivation medium supply unit 54 for supplying the cultivation medium. The cultivation medium may be provided in a predefined format, for example in the form of soil cubes with suitable dimensions (e.g. length×width×height of 40 mm×40 mm×30 mm), or in plant pots. The cultivation medium may be any medium suitable for cultivating cuttings. Examples of suitable cultivation media include but are not limited to a soil block, a soil cube, rock wool, and flower soil.

The cultivation medium supply unit 54 preferably takes the form of a conveyor belt 56. The conveyor belt 56 is readily aligned with the pick-and-plant tool 30.

An indentation unit (not shown) may be provided to pre-indent the cultivation medium to create recesses in which the cuttings may be placed by the pick-and-plant tool 30. Such an indentation unit is arranged for indenting the cultivation medium before planting i.e. it makes holes of suitable size and shape to accommodate a cutting to be planted, at the planting location. The use of an indentation unit can offer safe insertion of cuttings 2 into the cultivation medium 4. For example, when a cutting 2 is inserted into a preformed indentation rather than a closed surface of medium 4, it is not subjected to forces associated with shunting cultivation medium. The planting of cuttings can thus be done with less force, which reduces the risk of damaging the cuttings during planting. However, such an additional process step and equipment requirement can be disadvantageous, and according to some advantageous embodiments of the invention an indentation unit is not provided.

If present, the indentation unit may be arranged to indent the cultivation medium before the pick-and-plant head 34 plants the cuttings therein. Alternatively, the cultivation medium 4 may be prepared with indentations by a separate apparatus upstream in the process. In both cases the robot arm 32 of the pick-and-plant tool 30 is programmed to bring the pick-and-plant head 34 to the location of the indentations when planting a cutting.

In a preferred embodiment, discussed in more detail below, no indentation unit is provided. Rather the pick-and-plant head 34 simultaneously indents the cultivation medium while planting a cutting 2.

Figure 2:
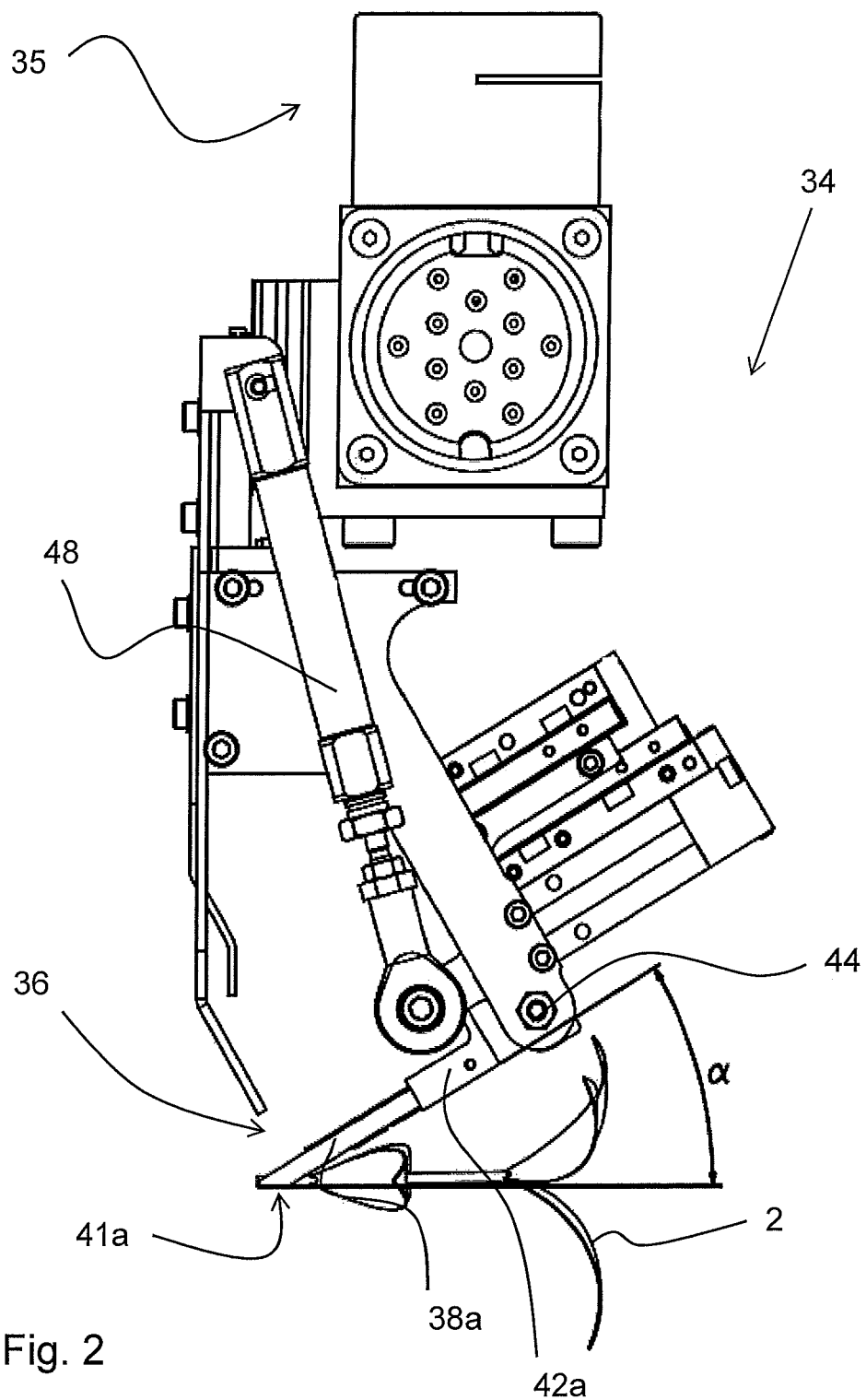
FIG. 2 shows a side view of a pick-and-plant head in a pick-up position.
Figure 3:
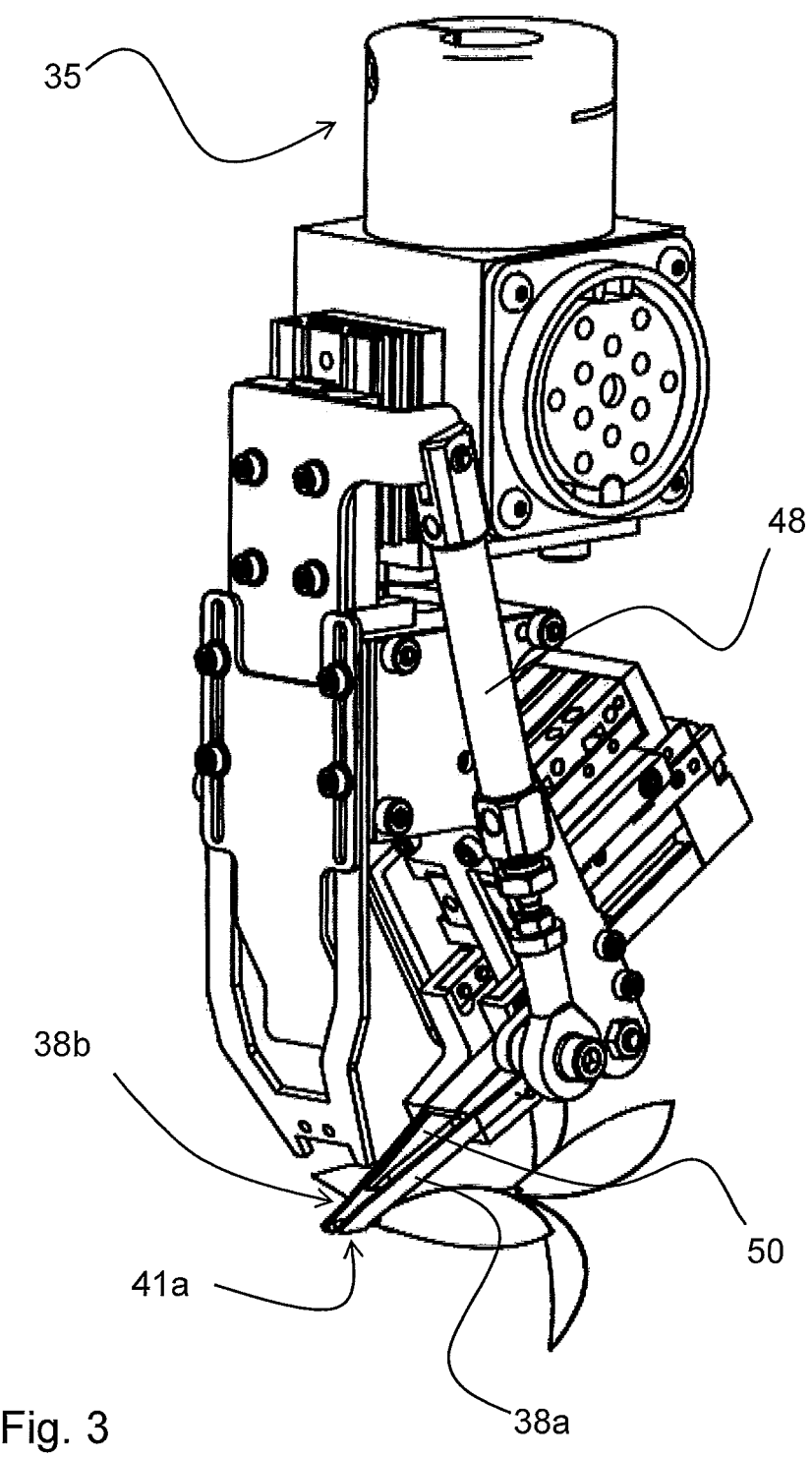
FIG. 3 shows an alternative view of the pick-and-plant head of FIG. 1, from the front and side.
Figure 4:
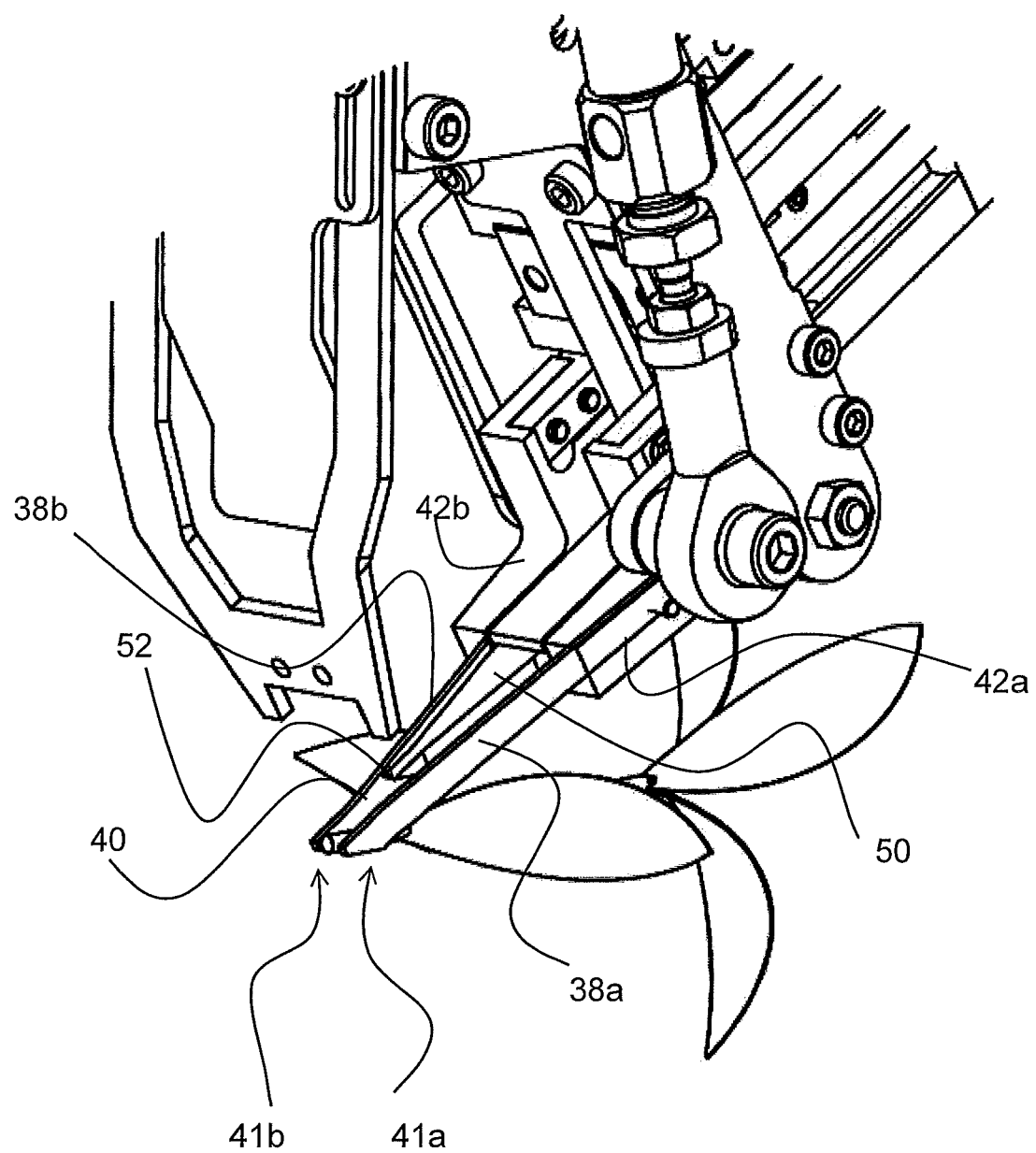
FIG. 4 shows an enlarged view of a part of the pick-and-plant head of FIG. 3.

FIGS. 2 to 4 show views of an embodiment of a pick-and-plant head 34 for attachment to a robot arm 32 via a connector 35. The pick-and-plant head 34 is provided with a grasper 36 arranged for picking up a cutting 2. The shown grasper is particularly suitable for grasping the stem of a stem cutting 2. Stem cuttings typically include a stem portion with an end that serves as a basis for roots to be formed, and a leaf portion arranged for developing plant elements such as leaves, buds and flowers.

Figure 5A:
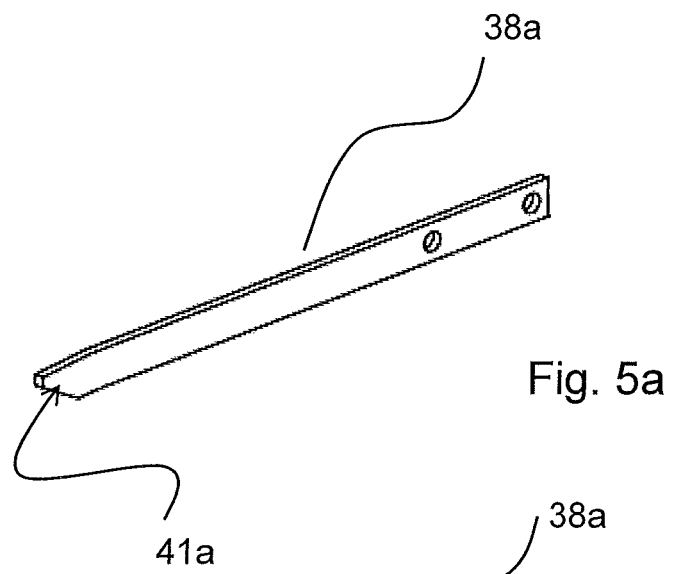
FIGS. 5a-c show elongate grasper members.

The grasper 36 comprises two opposed elongate members 38a, 38b. The elongate members 38a, 38b are generally blade shaped strips, and extend from a proximal end to a distal end. A single elongate member 38a is shown in FIG. 5a. The elongate members 38a, 38b are adjoined to the body of the pick-and-plant tool 34 at their proximal ends and converge with one another toward their distal ends so as to form forceps or pincers for grasping a cutting 2.

Each elongate member 38a, 38b is provided on an inner surface of its distal end with a grasping surface 40 for grasping the stem of the cutting 2. The grasping surface as shown is substantially flat, but may be contoured or ribbed to aid in grasping the stem of the cutting 2.

The elongate members 38a, 38b are preferably resiliently flexible transverse to the grasping direction. Such resilient flex allows for a firm grasp of the stem of the cutting, while at the same time avoiding an excessively forceful clamping that might damage a cutting 2. Forming the elongate members from resiliently flexible plastics or metals can achieve this flex. The elongate members 38a, 38b preferably comprise spring steel, stainless steel, aluminium, or aluminium alloys in this respect.

The elongate members 38a, 38b are movable transversely toward and away from one another. This is achievable by opposing movement of the attachment blocks 42a, 42b to which the elongate members 38a, 38b are respectively joined at their proximal ends. By movement of the attachment blocks 42a, 42b toward one another, the grasping surfaces 40 are brought together and grasp upon the stem of cutting 2. It will be clear to the skilled reader that the elongate members 38a, 38b could be brought together by other movements. For example, the elongate members 38a, 38b could be hinged to one another at a distal position, and pivoted toward and away from one another for grasping and releasing respectively.

The grasper 36 of the pick-and-plant head 34 is pivotable about an axis 44 such that it can translate from a generally horizontal pick-up position as shown in FIGS. 2 to 5, to a substantially vertical planting position shown in FIGS. 8d to 8g.

In the pick-up position, the elongate members 38a, 38b are arranged to grasp a cutting 2 that is in a substantially horizontal orientation upon the cuttings supply surface 14.

In the planting position, the elongate members 38a, 38b are arranged to hold a cutting substantially vertically with its cut or rooting end downward, in order to insert, and so plant, the cutting 2 into the cultivation medium 4. In the planting orientation, the orientation of the cuttings is a substantially vertical orientation with the stem portion facing downwards.

In the shown embodiments, the cutting is rotated about 90° to bring the cutting from a horizontal position to a vertical position for planting. However, the rotation may also, for example, be from 80° to 100°, depending upon circumstances and cutting type.

In the shown embodiment, pivoting of the pick-and-plant head 34 about axis 44 is achieved by way of an extensible and retractable pneumatic arm 48.

As shown in FIG. 2, the grasper 36 is preferably angled compared to the cuttings 2. That is, in the pick-up position, the grasper is angled from horizontal by an angle alpha. Angle alpha is preferably 10° to 80°, preferably from 15° to 70°, and most preferably from 25° to 60°, when the gripper head is in the pick-up orientation. In FIG. 2 angle alpha is about 30°. Providing the grasper 36 at an angle allows for the horizontal cutting to be firmly grasped at its cut or root end, while avoiding damage to any leaves present at the top of the cutting. In addition, the angled grasper 36, once rotated into the vertical planting position, offers vertical support to the cutting 2, that is, along the stem axis, so that upon insertion into the cultivation medium 4 the elongate members 38a, 38b are able to form a scaffold about the stem supporting it and avoiding damage thereto upon insertion.

As discussed above, in some circumstances the apparatus may be provided with an apparatus for pre-indenting the cultivation medium 4. However, it is an advantage of a preferred embodiment of the present invention that the grasper 36 of the pick-and-plant head 34 is such that no advance indentation of the cultivation medium 4 is required. This is at least partially achieved through the parallel support offered by the elongate members 38a, 38b.

In a most advantageous scenario, this reduces or overcomes the need to pre-indent the cultivation medium with cavities to accept cuttings. This reduces the number of steps needed to complete planting since no additional indentation step is required. It also reduces complexity in alignment, because the indentation is made simultaneously with placement of the cutting, meaning there is no requirement to detect indentation positions with a camera system, or to accurately align either the pick-and-plant head with indentations, or to align indentations in relation to the other components of the system. In addition, such direct insertion may provide a snugger contact of the cultivation medium about the cutting stem, than is achieved by pre-indentation. This is because pre-indentation may create indents with a too great a diameter for a particular cutting, taking into account that a standard indentation size is used which is large enough for expected stem sizes and accuracy tolerances in placement. A snugger fit within the cultivation medium can provide improved rooting and nutrient uptake for a cutting, as well as physical orientation.

To offer maximum support, a cutting 2 is grasped by the elongate members 38a, 38b close to its cut or root surface. The distal ends of the elongate members 38a, 38b are then at least partially inserted into the cultivation medium 4 along with the cut or root end of the cutting 2 at the planting stage. The tips of the elongate members 38a, 38b in this manner buttress the stem and provide the rigidity to push aside cultivation medium 4, in effect simultaneously indenting the cultivation medium and planting.

The distal ends of the elongate members 38a, 38b are provided with truncated or angled end faces 41a, 41b such that these are substantially parallel with the cuttings supply surface 14 when the pick-and-plant head 34 is in the pick-up configuration. The end faces 41a, 41b are thus preferably substantially horizontal when the pick-and-plant head 34 is in a horizontal pick-up configuration. This provides an extended grip area upon the cutting 2 as well as a generally blunt, low damage interface with the cuttings supply surface 14.

The pick-and-plant tool 30 may use one or more images obtained with the camera system 20 to determine at what position a specific individual cutting should be picked up to enable suitable placement in the planting unit. Determining the desired position of pick-up can be done by analysis using pattern recognition algorithms known to those skilled in the art.

Figure 5B:
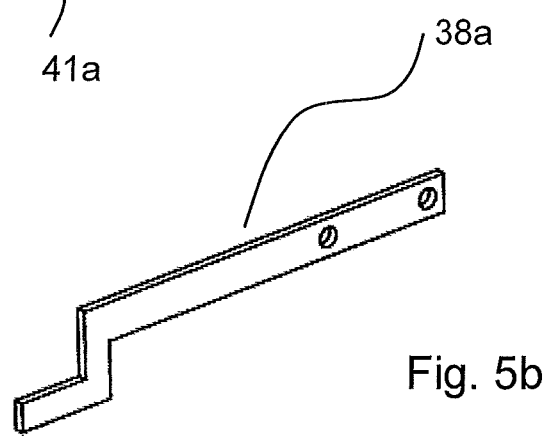
Figure 5C:
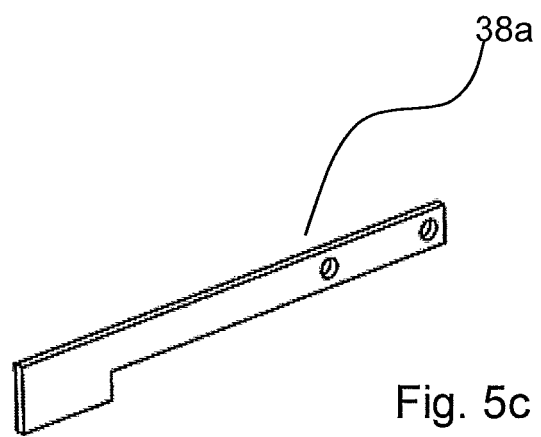

While the shown embodiments make use of straight elongate members (as shown in FIG. 5a) angled from horizontal, a similar effect in terms of picking-up and planting could be readily achieved by way of a dogleg or L-shape as shown in FIGS. 5b and 5c respectively. Such alternative forms are also considered to be angled within the meaning of this document, the angle being the effective angle of inclination above the cutting in the pick-up orientation.

Figure 6:
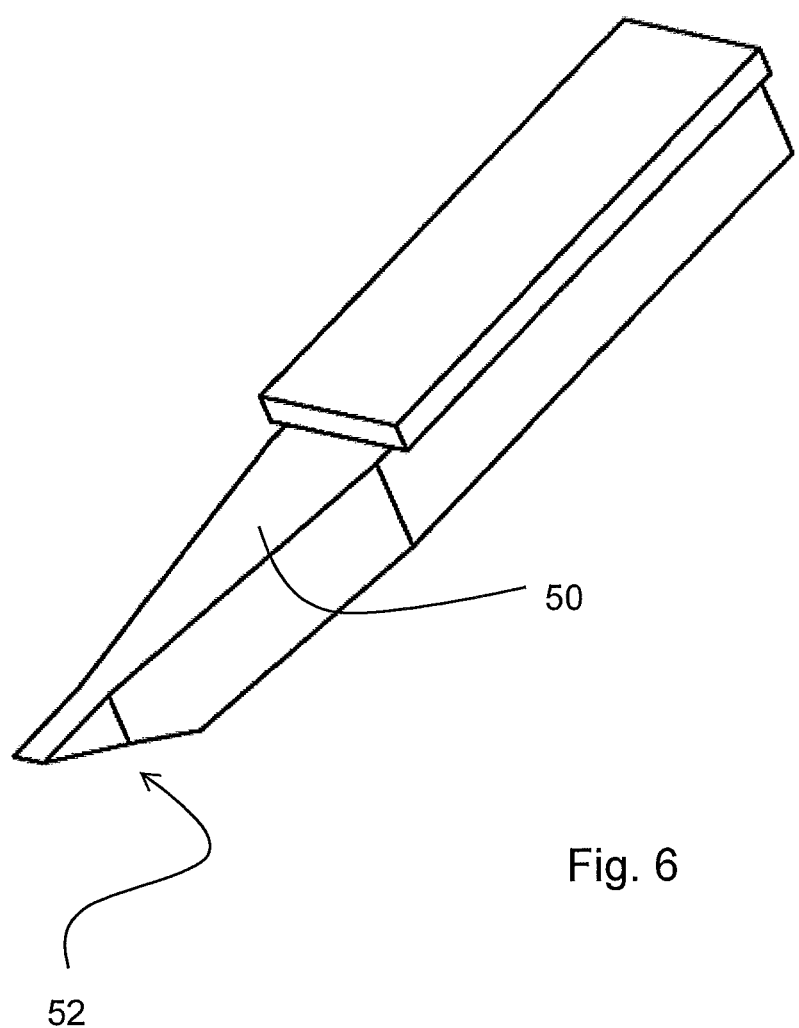
FIG. 6 shows a ram.

The pick-and-plant head 34 may also be provided with a ram 50. The functioning of the shown ram 50 will be more fully discussed in relation to FIGS. 8a-j below. FIG. 6 shows the ram 50 in greater detail.

A function of the ram 50 is to abut the body of the cutting 2 at the stage of planting when the elongate members 38a, 38b, are withdrawn from, or release, the cutting 2. The cutting abuts against the distal end face 52 of the ram 50 during its release from the pick-and-plant head 34 into the cultivation medium 4. In this manner the cutting 2 is secured in place in the desired planting orientation, while allowing simple release from the grasper 36.

The end face of the ram 50 is preferably angled or truncated similarly to the elongate members 38a, 38b. The surface of the ram end face 52 can have any form suitable for abutting a cutting body. For example, it may be planar, as illustrated, or it may be concave, ribbed, or contoured to generally match an abutted surface of a cutting 2.

Furthermore, the illustrated ram 50 may function to force apart elongate members 38a, 38b during a planting step. The ram 50 is in this respect positioned between the elongate members 38a, 38b, and the elongate members 38a, 38b can be forced apart either by retraction over the ram 50, or by forward insertion of the ram 50 therebetween. The ram 50 is generally wedge shaped, being the inverse of the inner surfaces of the elongate members 38a, 38b. Other forms achieving the same function can be contemplated, such as a rod-shaped ram.

Generally, the pick-and-plant tool 30 is programmed to assume that the cuttings supply surface 14 is at substantially the same vertical level throughout the supply system 10. However, to ensure that local deviations from such average level do not jeopardize the performance of the pick-and-plant head 34, a surface detection sensor may be provided. In such case, the grasper 36 of the pick-and-plant head 34 may be activated for grasping upon detection of the surface.

Figure 7:
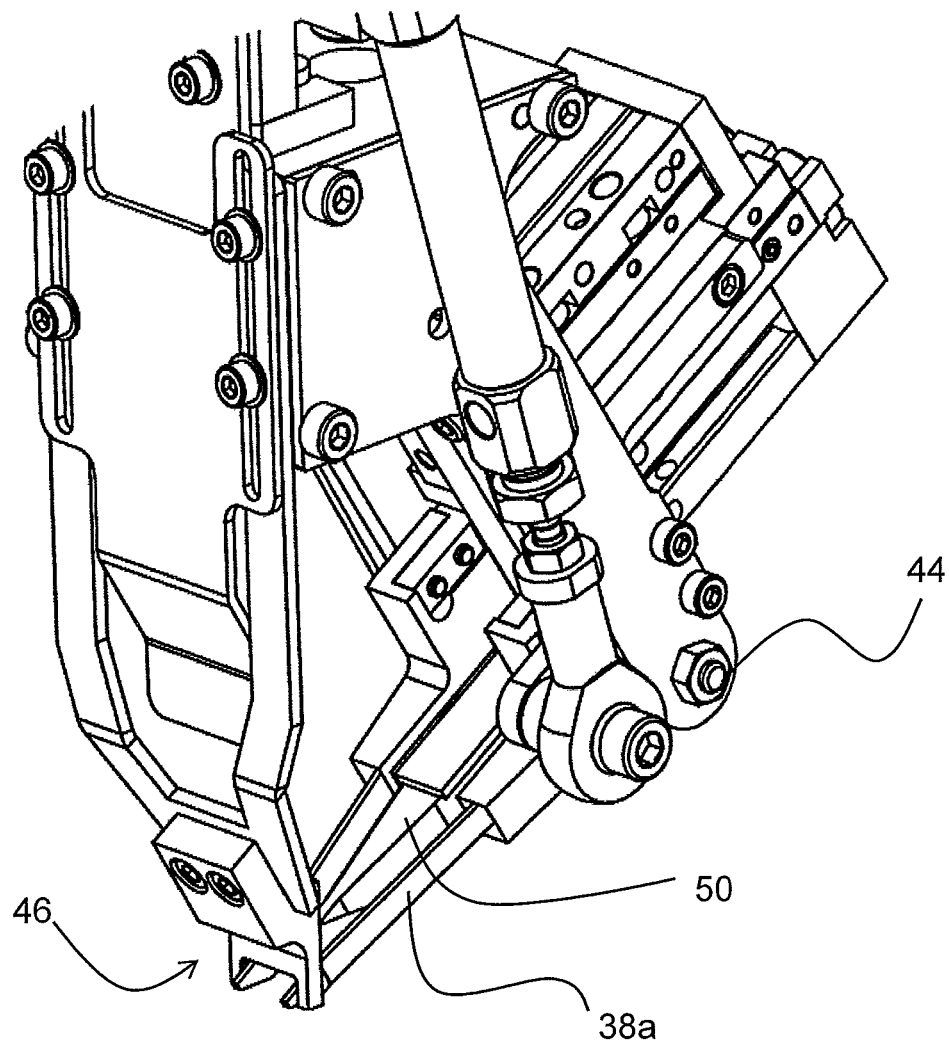
FIG. 7 shows an embodiment similar to that of FIG. 4 including a spacer.

In an alternative embodiment, shown in FIG. 7, a spacer 46 is provided, which abuts the surface of the cutting supply surface 14 ahead of the distal ends of elongate members 38a, 38b. The spacer 46 has a lower surface that is preferably at least 0.1 mm lower than the lowest point of the elongate members 38a, 38b when the pick-and-plant head 34 is in the pick-up position shown in FIG. 5. This aids in preventing the distal tips of the elongate members 38a, 38b from coming into contact with the cuttings supply surface 14, and as such can help to reduce abrasion of the supply surface 14 that might otherwise result from scraping of the tips of the elongate members 38a, 38b across it as they are brought toward one another during grasping.

Turning to FIGS. 8a-8j a number of different orientations of the pick-and-plant head 34 during the picking and planting process are shown to illustrate a method of picking and planting a cutting 2.

Figure 8A:
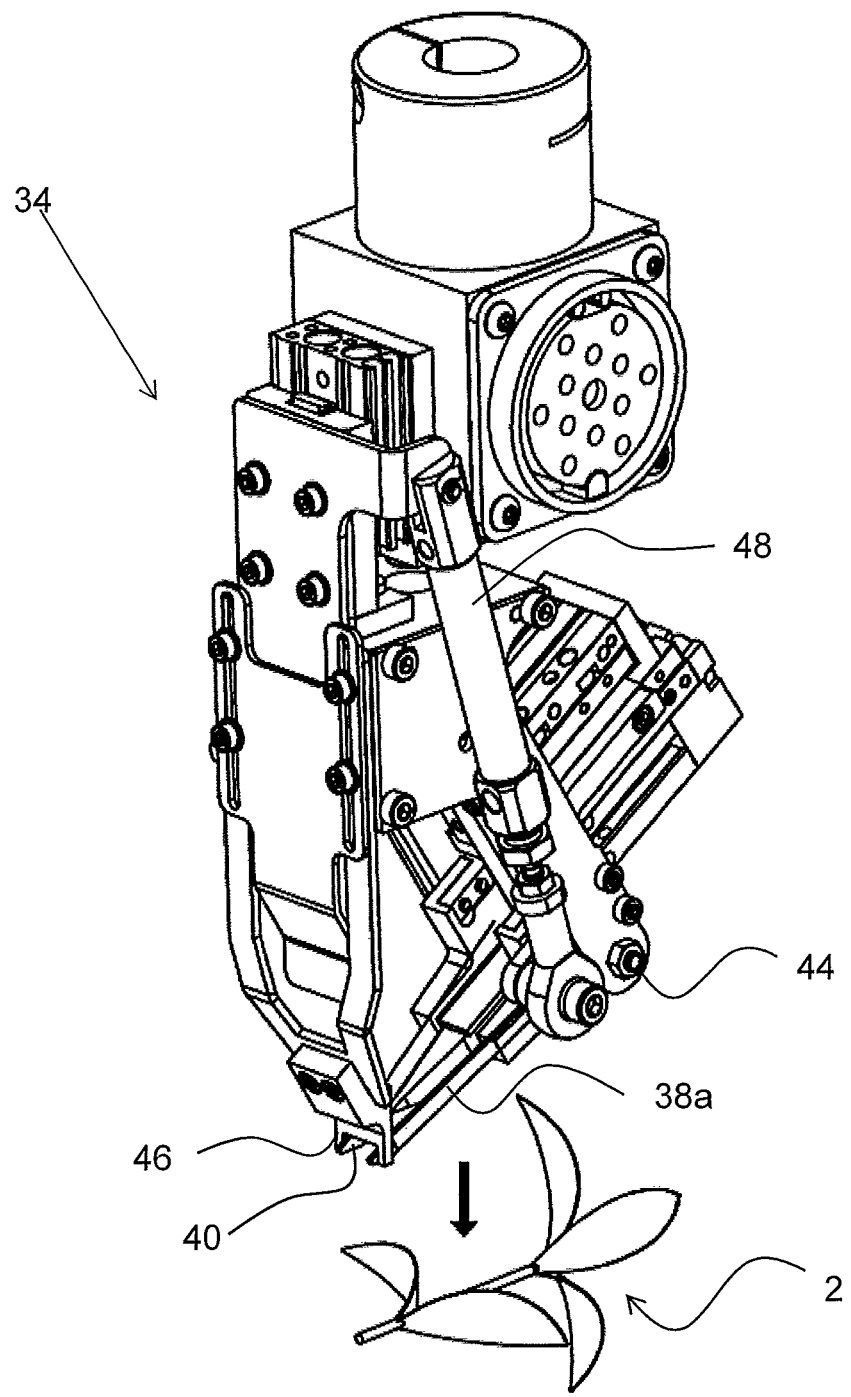
FIGS. 8a-j show pick and plant stages using the pick-and-plant head of FIG. 1.
Figure 8B:
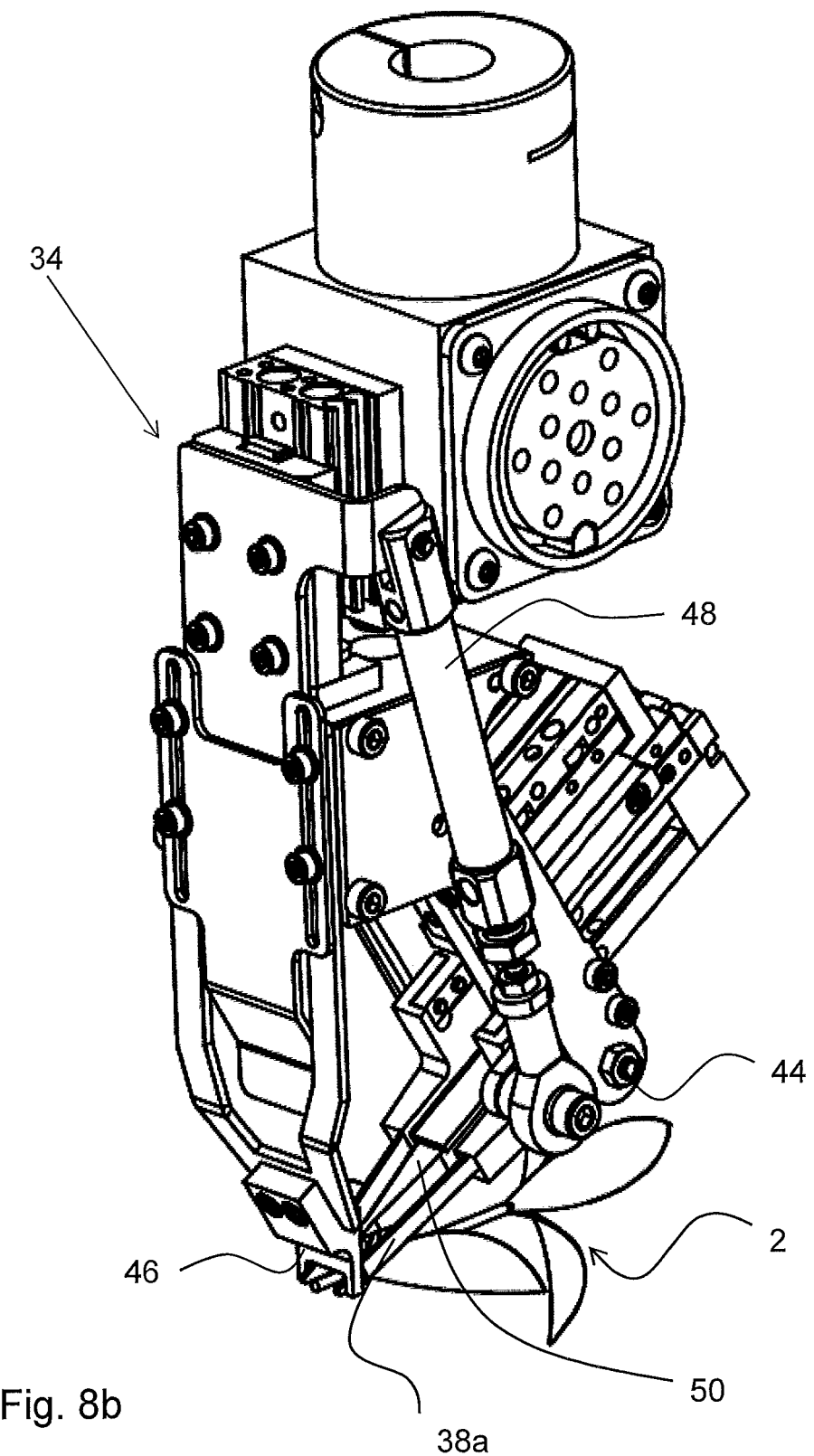

As discussed above, the pick-and-plant head 34 is carried upon the distal end of a robot arm 32 which transports the pick-and-plant head 34 between picking and planting positions, and vice versa. First, the robot arm 32 moves the pick-and-plant head 34 towards an identified single cutting on the basis of information obtained with the camera system 20. The elongate members 38a, 38b of the grasper are in an open state, i.e. when the elongate members 38a, 38b are open to accept a cutting therebetween. FIGS. 4, 8a and 8b show the grasper in an open state.

As illustrated in FIG. 8a, the robot arm 32 brings the pick-and-plant head 34 into the region of a selected cutting 2 in an orientation ready for picking it, that is, with the distal ends of the elongate members 38a, 38b aligned with and facing in the direction of the cut end of the cutting 2.

In FIG. 8b the pick-and-plant head 34 is positioned with a suitable portion of the cutting 2 between the grasping surfaces 40. The selected portion of the shown stem cutting 2 is close to or at the cut end of the stem.

Figure 8C:
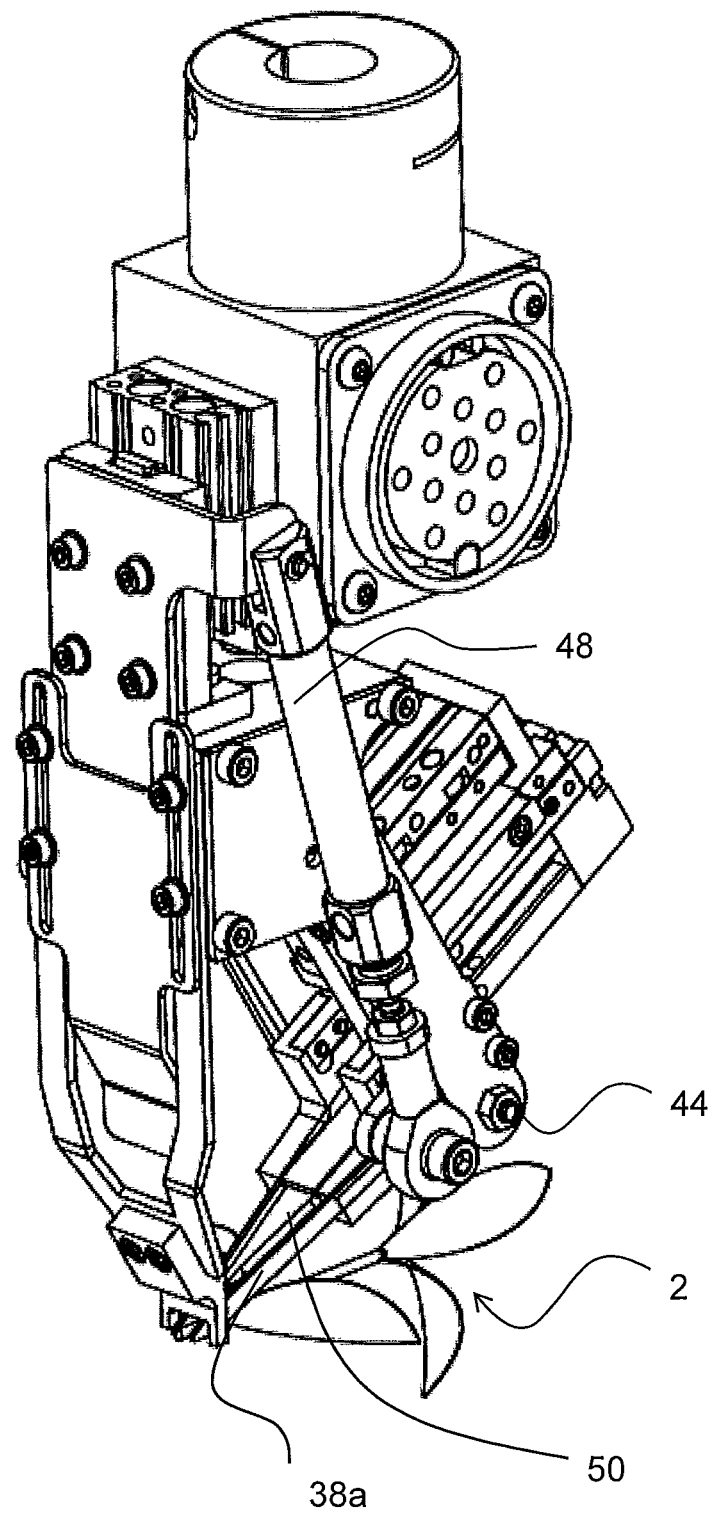

Moving to FIG. 8c, the attachment blocks 42, and thus also the elongate members 38a, 38b as a consequence, are moved toward one another, for example by pneumatics. The grasping surfaces 40 come to bear upon the stem of the cutting so that it is securely grasped.

Figure 8D:
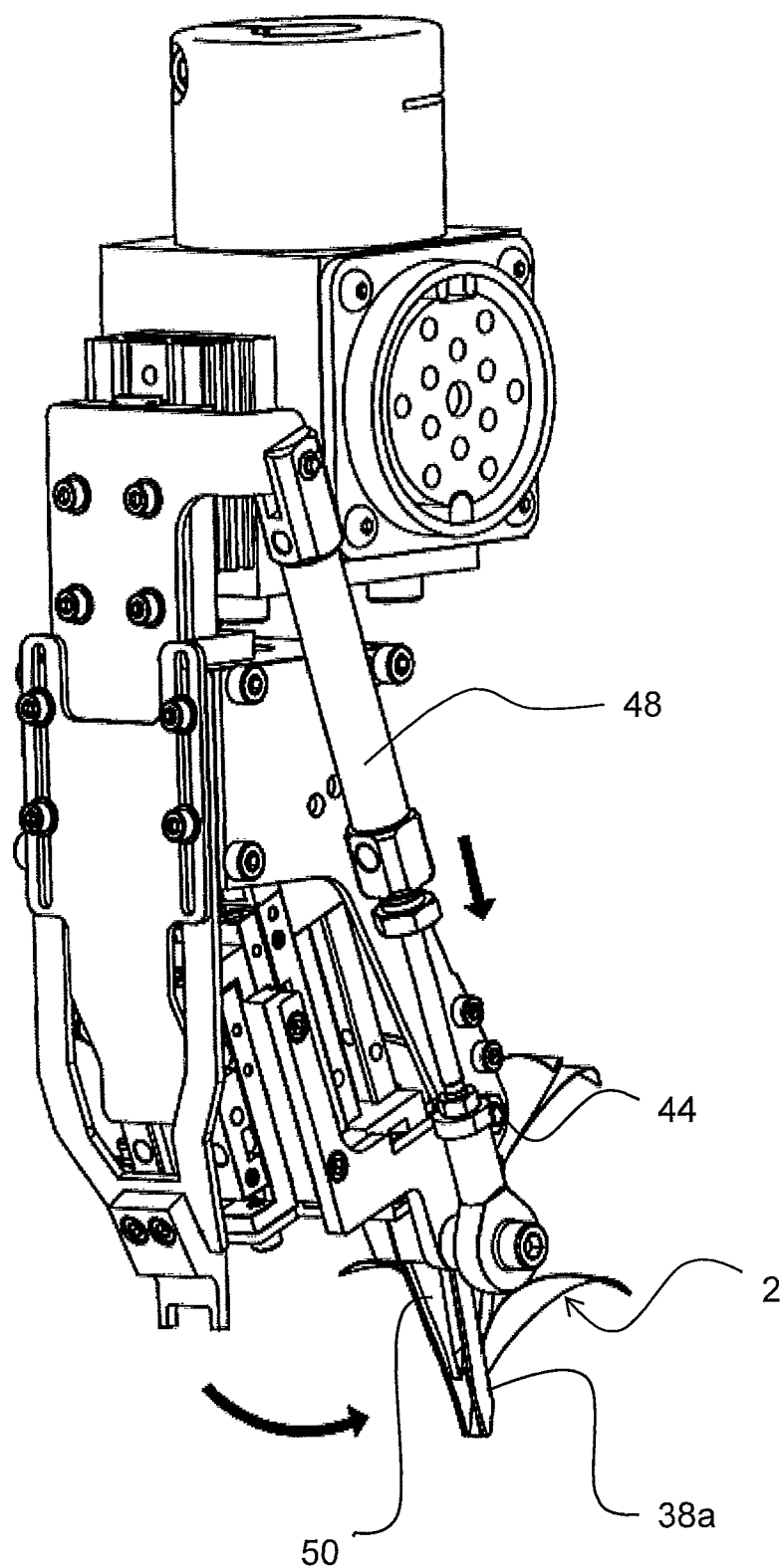

The robot arm 32 then moves the pick-and-plant head 34 along with the grasped cutting 2 away from the cuttings supply surface into an open volume where the grasper 36 is rotated 90° about axis 44 translating the cutting 2 from a generally horizontal orientation to a generally vertical orientation with its cut end disposed downwardly ready for insertion into a cultivation medium 4, as shown in FIG. 8d.

Figure 8E:
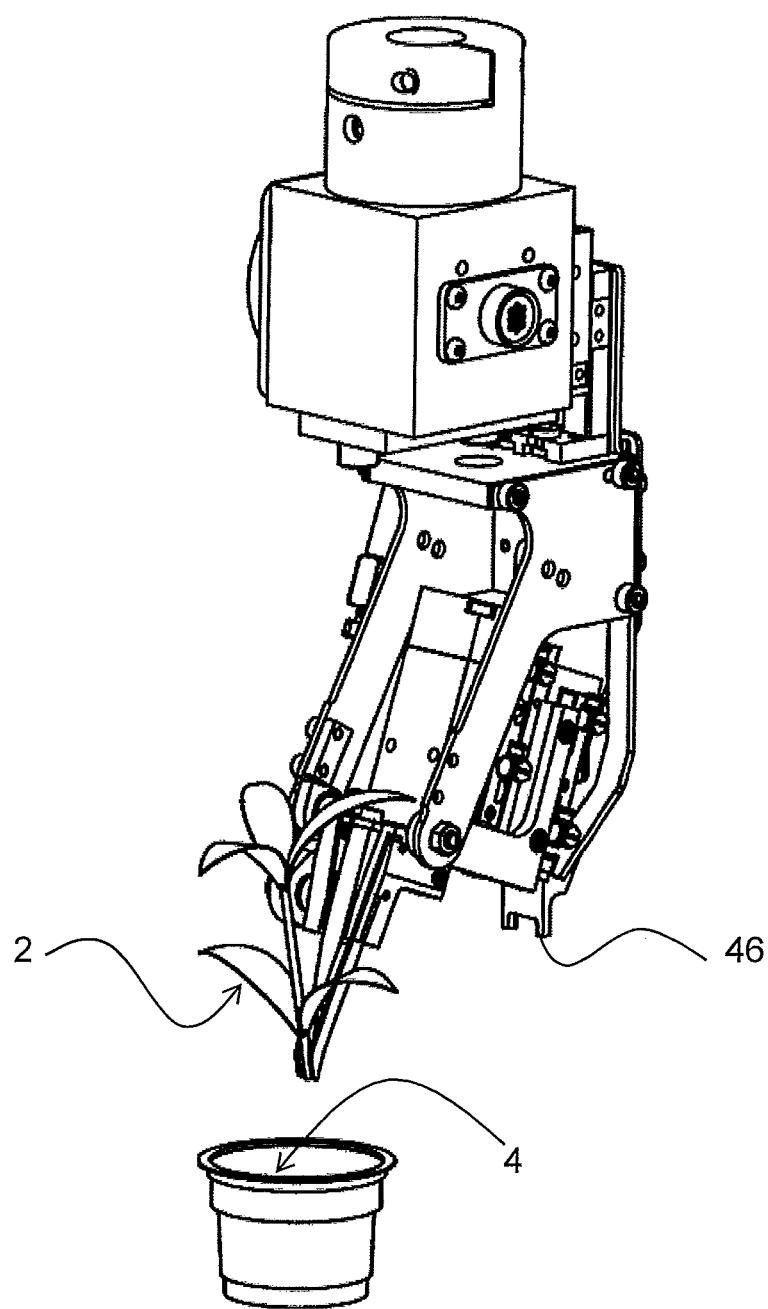

The robot arm simultaneously, or thereafter, positions the pick-and-plant head at pre-planting coordinates above a plant cultivation medium 4, FIG. 8e.

Figure 8F:
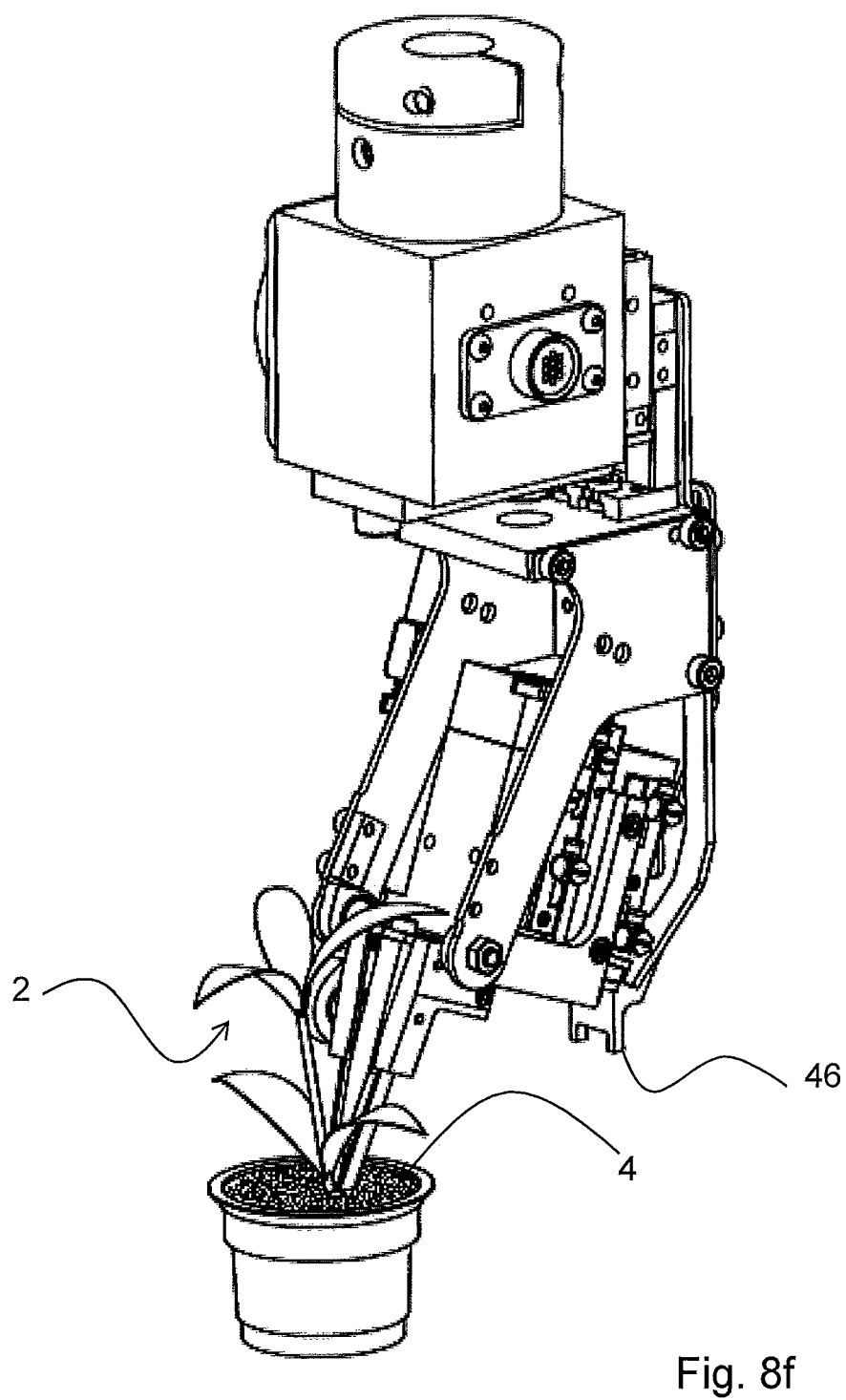

As shown in FIG. 8f, the pick-and-plant head descends to plant the cutting 2 within the cultivation medium 4. The distal ends of the elongate members 38a, 38b also penetrate the cultivation medium and so support the cutting 2 against insertion forces that might otherwise damage it.

Figure 8G:
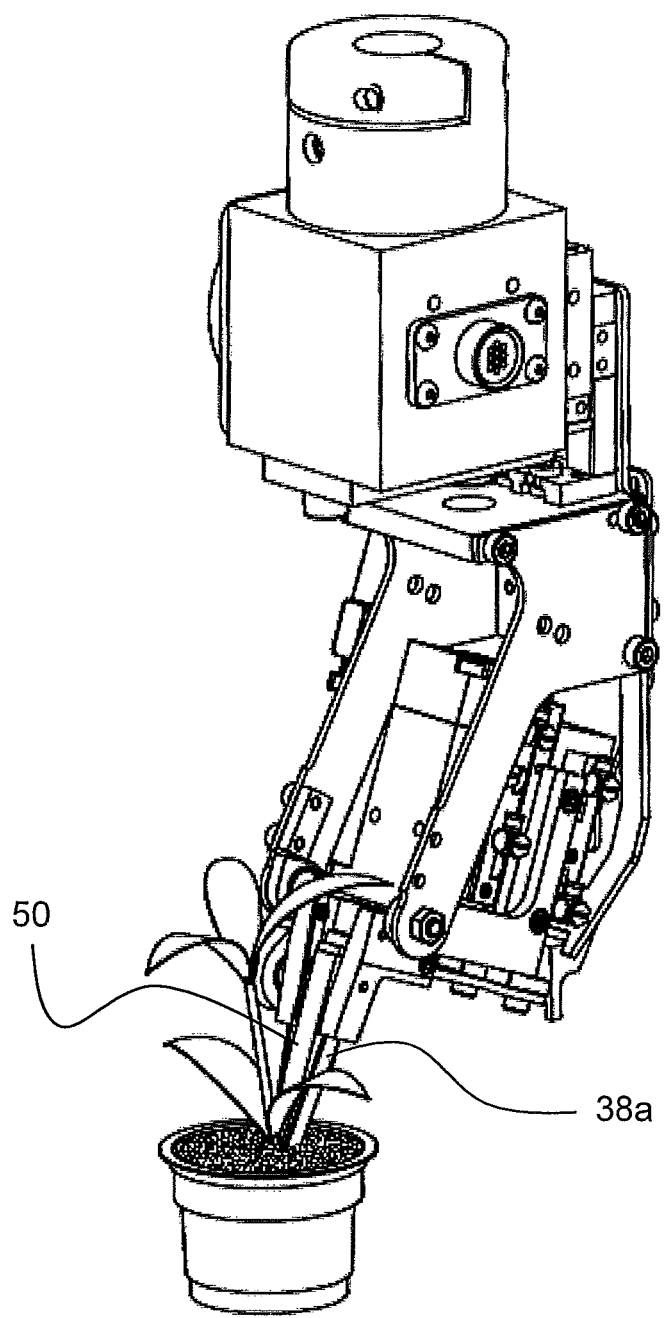

In FIG. 8g, the ram 50 is advanced toward the cutting 2 to abut with its end face 52 against it, securing the cutting within the cultivation medium 4.

Figure 8H:
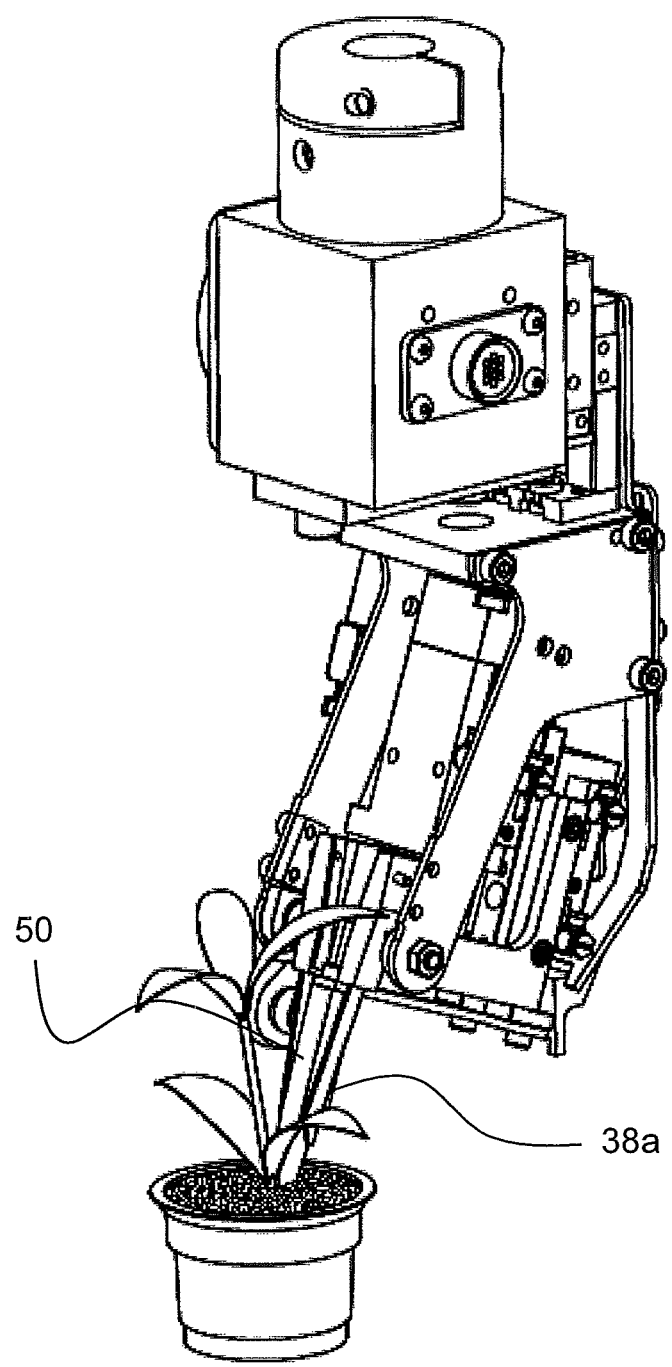

In FIG. 8h, the elongate members 38a, 38b are proximally retracted. As they retract their inner surfaces engage with the wedged ram 50 such that the elongate members are forced laterally apart to release the cutting 2 from the grasper 36.

Figure 8I:
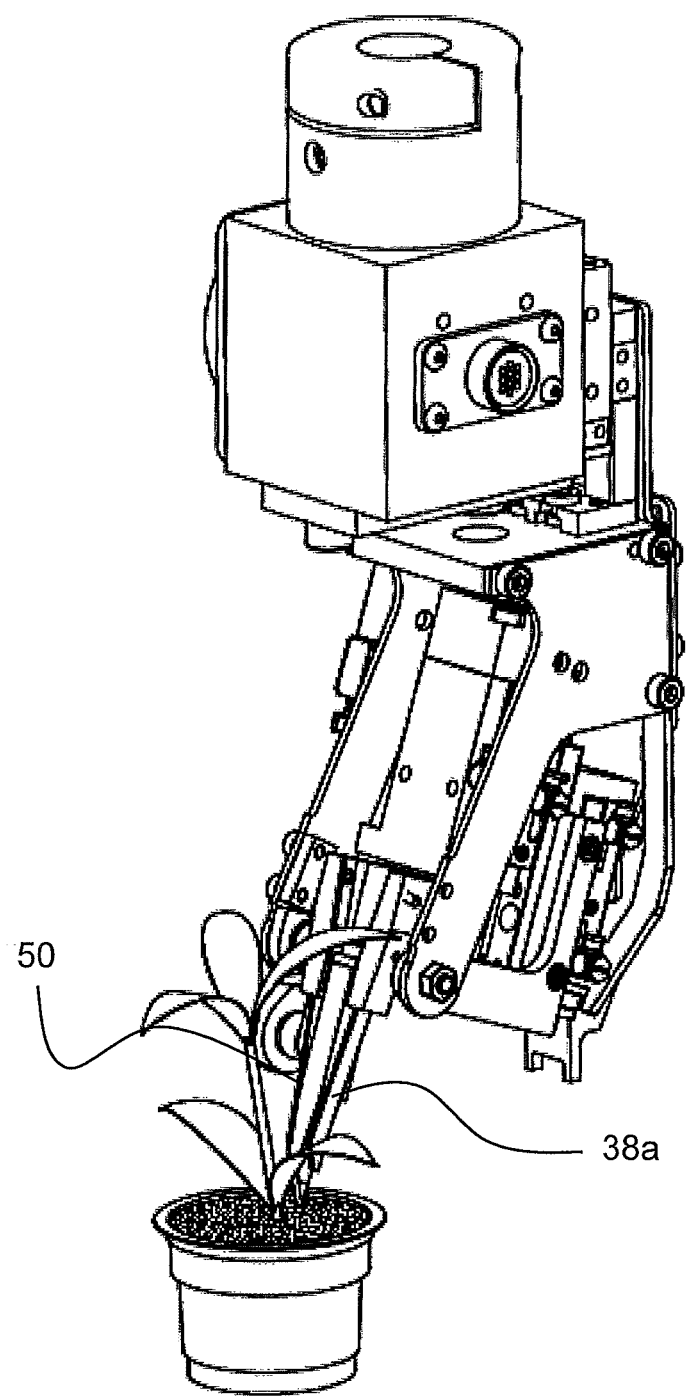
Figure 8J:
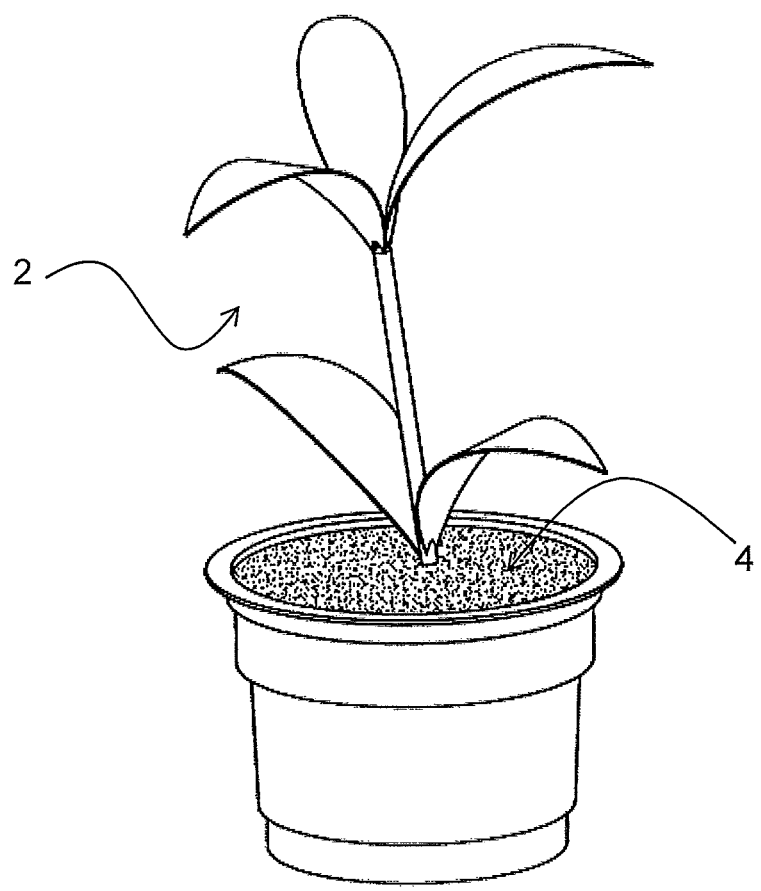

Finally, the pick-and-plant head 34 is carried away from the cutting by the robot arm 32, FIG. 8*i*, and planting of the cutting within the cultivation medium 4 is complete, FIG. 8*j*.

The above steps are repeated to plant further cuttings, either within the same container as the first cutting, or in further containers.

In an alternative embodiment, not shown, the pick-and-plant tool 30 may be arranged for simultaneous picking and planting of a plurality of cuttings 2 in a cultivation medium 4. In such an embodiment, the pick-and-plant head 34 is provided with a plurality of graspers, each for grasping a single cutting 2, whereby a number of cuttings can be collected and then simultaneously planted in the plant cultivation medium 4.

The invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention, which is defined in the accompanying claims.

The invention claimed is:

1. A pick-and-plant head for planting a plant cutting in a cultivation medium comprising:
   a. a grasper comprising opposed grasping surfaces for grasping a portion of a plant cutting between them, wherein the grasper is arranged to pick a plant cutting placed on a supply surface in a horizontal orientation, and wherein the grasper is arranged to rotate the plant cutting into a vertical orientation for directly planting the plant cutting in the cultivation medium, wherein the cultivation medium is soil or rockwool; and
   b. an abutment comprising an abutment surface for abutting the plant cutting, wherein the grasper and the abutment are moveable relative to one another and are arranged so that during release of the plant cutting from the grasper, the abutment passes between the opposed grasping surfaces, and the plant cutting is abutted by the abutment; and wherein said pick-and-plant head is a tool-head arranged to carry out both picking of the plant cutting and planting of the grasper directly into said soil or rockwool.

2. The pick-and-plant head according to claim 1, wherein the abutment comprises a ram having a distal end, wherein a distal end-face of the ram is the abutment surface for the plant cutting.

3. The pick-and-plant head according to claim 2, wherein the distal end of the ram has a wedge-shape.

4. The pick-and-plant head according to, claim 3, wherein the distal end of the ram is truncated at an angle to be horizontal when the pick-and-plant head is in a cutting pick up position.

5. The pick-and-plant head according to claim 2, wherein the distal end of the ram has a wedge-shape that is truncated.

6. The pick-and-plant head according to claim 2, wherein the opposed grasping surfaces are arranged to recede from one another when the ram is inserted therebetween.

7. The pick-and-plant head according to claim 2, wherein the opposed grasping surfaces are arranged to be wedged apart when the ram is inserted therebetween.

8. The pick-and-plant head according to claim 2, wherein the grasper comprises a pincer having opposed fingers with planar, distal gripping surfaces; and wherein the abutment comprises a ram, wherein the ram is elongate with a distal end, the distal end is wedge-shaped, and the ram is positioned between the fingers of the pincer, whereby the ram and fingers are moveable relative to one another for axial reciprocation of the ram for insertion between the opposed gripping surfaces.

9. The pick-and-plant head according to claim 2, wherein the ram is parallel with the grasper.

10. The pick-and-plant head according to claim 1, wherein the grasper comprises at least one elongate member, and one of said opposed grasping surfaces forms an inner surface of the at least one elongate member.

11. The pick-and-plant head according to claim 10, wherein the at least one elongate member has a distal end, an inner surface of each distal end forming a grasping surface.

12. The pick-and-plant head according to claim 1, wherein the grasper is vertically pivotable.

13. The pick-and-plant head according to claim 1, wherein the grasper is angled from horizontal by from 10° to 80°, when the plant cutting is in a pick-up orientation.

14. The pick-and-plant head according to claim 1, wherein the pick-and-plant head further comprises a spacer arranged to space the grasper from the horizontal cuttings supply surface during a pick up operation.

15. A robotic arm comprising a pick-and-plant head according to claim 1.

16. An apparatus for placing cuttings of plants in a cultivation medium comprising:
   a. a cuttings supply system for supplying a plurality of cuttings;
   b. a camera system for identifying cuttings among the plurality of cuttings provided by the supply system that are suitable for individual pick up by using pattern recognition;
   c. a robotic arm provided with a pick-and-plant head, wherein said pick-and-plant head is in accordance with claim 1.

17. The apparatus according to claim 16, wherein the pick-and-plant head is arranged to pick up a cutting at a predetermined distance from an end of said cutting to be planted in the cultivation medium in dependence on one or more images obtained with the camera system.

18. A method of planting plant cuttings in a cultivation medium comprising:
   a. providing a scattered plurality of cuttings upon a horizontal supply surface of a cuttings supply system;
   b. identifying by way of pattern recognition, at least one cutting amongst the plurality of cuttings as suitable for individual pick up;
   c. picking said identified at least one cutting from the supply surface in a horizontal orientation, with a pick-and-plant head on a robotic arm;
   d. rotating the picked at least one cutting into a vertical orientation with a plantable end of the at least one cutting facing downward, with the pick-and-plant head, wherein said plantable end is a stem portion that serves as a basis for roots; and
   e. planting the picked at least one cutting that has been rotated into a vertical orientation directly into a cultivation medium, wherein the cultivation medium is soil or rockwool, with the pick-and-plant head;
   wherein the pick-and-plant head is in accordance with claim 1.

* * * * *